Dec. 4, 1928.  
E. A. SPERRY, JR  
GYROSCOPIC COMPASS  
Filed Jan. 22, 1920  
1,694,192  
3 Sheets-Sheet 1
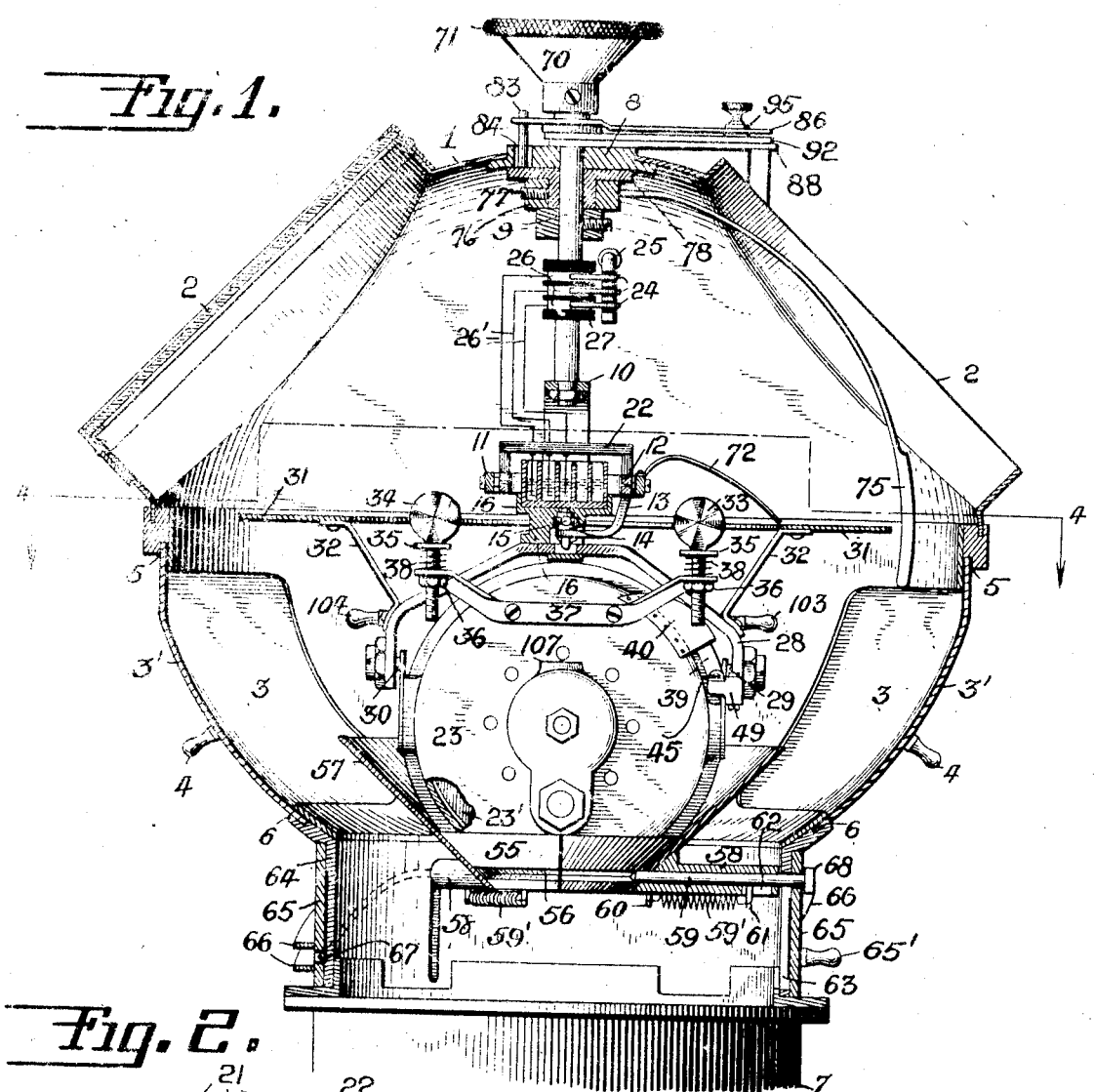
INVENTOR  
ELMER A. SPERRY, JR.  
BY  
Herbert H. Thompson  
his ATTORNEY Dec. 4, 1928.

E. A. SPERRY, JR 1,694,192

GYROSCOPIC COMPASS

Filed Jan. 22, 1920

INVENTOR
ELMER A. SPERRY, JR.
BY
Herbert H. Thompson
his ATTORNEY

Dec. 4, 1928.  
E. A. SPERRY, JR  
GYROSCOPIC COMPASS  
Filed Jan. 22, 1920  
1,694,192  
3 Sheets-Sheet 3
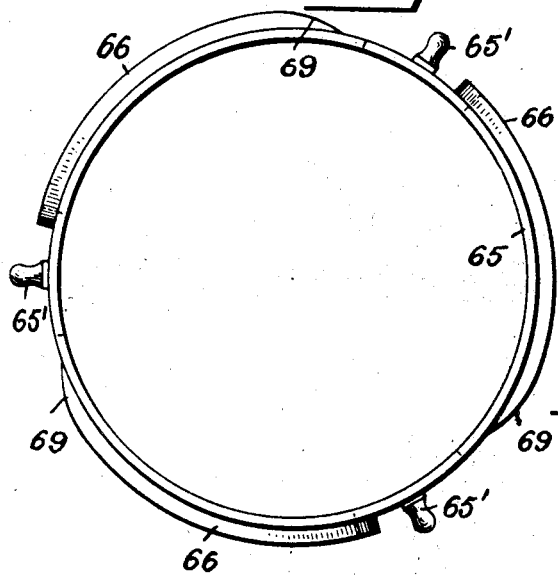
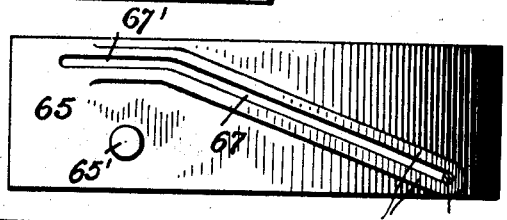
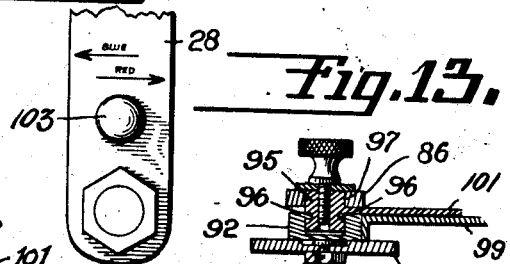
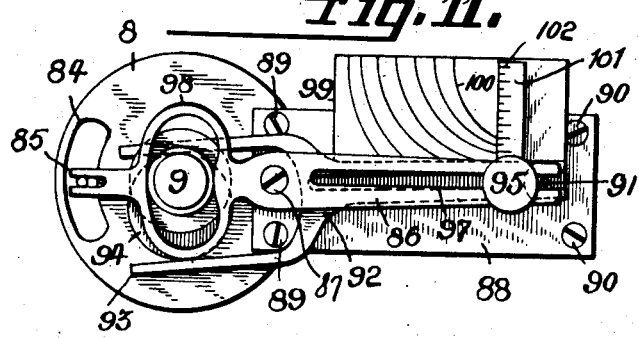
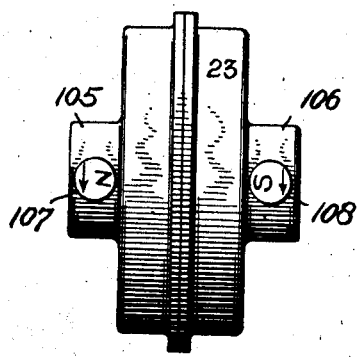
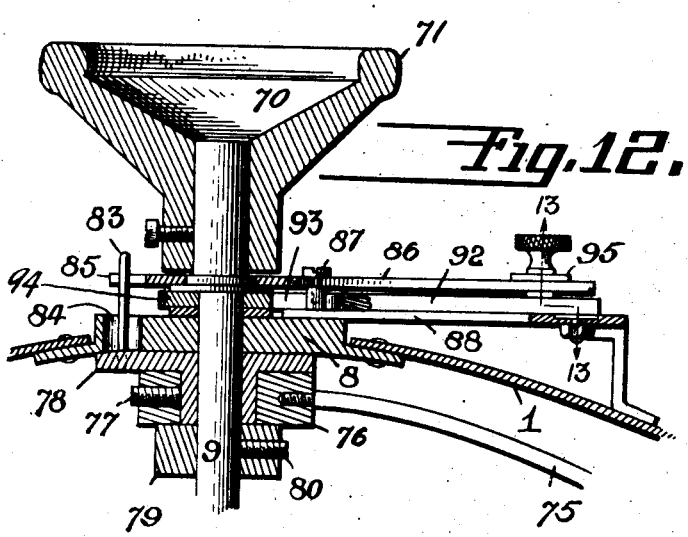
INVENTOR  
ELMER A. SPERRY, JR.  
BY  
Herbert H. Thompson  
his ATTORNEY Patented Dec. 4, 1928.

1,694,192

UNITED STATES PATENT OFFICE.

ELMER A. SPERRY, JR., OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC COMPASS.

Application filed January 22, 1920. Serial No. 353,212.

This invention relates to gyro compasses and is concerned chiefly with the provision of a practical gyro compass especially adapted for use on aircraft, motor boats or other light, fast moving vehicles. One of the objects of my invention is to provide powerful damping means which acts quickly to suppress oscillations of the compass in a minimum time.

Another object is to provide simple and effective means to readily restore the compass to the meridian in case it has departed therefrom.

A further object is the construction of improved means for correcting the compass readings in accordance with the heading, speed, and latitude.

Still another object is the provision of simple and efficient means for centralizing and locking the gyroscope with respect to the vehicle on which it is mounted.

Other objects will become evident as the description proceeds and will be pointed out in the appended claims.

Referring to the drawings, wherein I have shown what I now consider to be the preferred form of my invention:

Fig. 1 is an elevation of my improved compass, parts being shown in section.

Fig. 2 is a sectional view of a detail.

Fig. 3 is a sectional view of a detail.

Fig. 9 is a plan view of a detail.

Fig. 10 is a side elevation of Fig. 9.

Fig. 11 is a plan view of a correction device.

Fig. 12 is a vertical section of the correction device shown in Fig. 11.

Fig. 13 is a vertical section taken on line 13—13 of Fig. 12.

Fig. 14 is a view of a detail.

Fig. 15 is a view of a detail.

Figure 4:
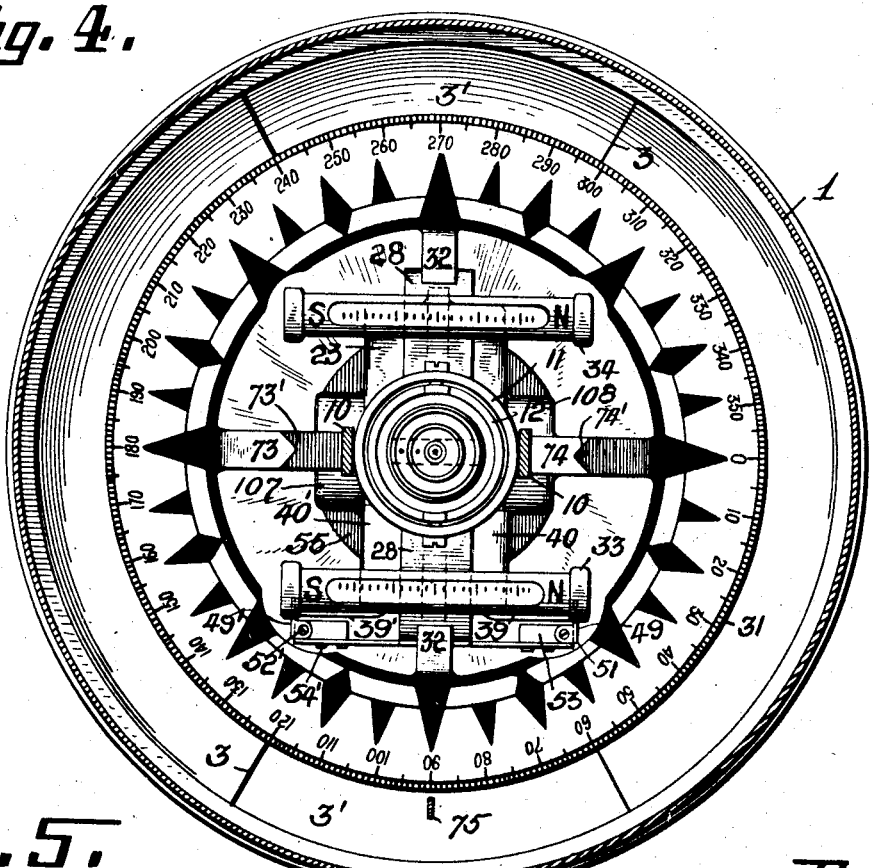
Fig. 4 is a horizontal sectional view taken on line 4—4 of Fig. 1.

In Fig. 1 I have shown my compass mounted in a suitable casing 1 provided with window openings 2 and with openings 3 for affording access to the interior. Said openings 3 may be closed by doors 3', which are preferably provided with knobs 4. Each door may slide at its upper and lower edges in grooves 5 and 6 in the casing as shown. The casing may be supported on any suitable base 7.

Mounted in the top of casing 1 is a bushing 8 in which is rotatably mounted a rod or shaft 9. Said shaft supports, at its lower end, a bracket 10 preferably arch-shaped and carrying a ring 11 pivoted thereto. A second ring 12 is pivoted within ring 11 at right angles to the pivots supporting ring 11 in bracket 10 and carries a depending arm 13 provided with a bearing portion 14.

As in my prior application for non-pendulous gyro compass, filed November 8, 1919, Serial No. 336,690, I prefer to support the weight of the compass through the medium of a ball 15 carried by bearing portion 14 of arm 13. The compass is connected, in a manner to be later described, to a member 16 directly supported, through a bearing portion 16' (see Fig. 2) on ball 15. For conducting three phase current for driving the gyro rotor, irrespective of the position of the compass in azimuth with respect to casing 1, I have shown a container 17 of insulating material carried by member 16 and divided into a central circular compartment 18 and two annular compartments 19 and 20 concentric therewith. Pins 21, mounted in an insulating support 22 carried by ring 12, extend into said compartments and are adapted to complete a circuit through engagement with suitable conducting liquid, such as mercury contained therein. It is thus evident that contact between pins 21 and the liquid in container 17 will be maintained regardless of relative rotation between shaft 9 and said container. It is evident, however, that compartments 18, 19, and 20 need not be entirely circular, since they may be arcuate if shaft 9 be turned to follow up the movements of the compass card.

To avoid twisting of the leading in wires upon rotation of shaft 9, I have shown brushes 24 to which said wires may be connected, the brushes being suitably insulated and fixedly attached to casing 1, as through a suitable supporting rod 25. Said brushes may cooperate with collector rings 26 mounted upon an insulating sleeve 27 on shaft 9 and suitably insulated from each other. Rings 26 and pins 21 may obviously be connected by suitable conductors, such as wires 26'.

The casing in which the gyro rotor 23' is journaled is shown at 23. For supporting the gyro casing 23 I have shown a bracket 28 connected to member 16 so as to depend therefrom, the gyro casing being pivoted to said bracket about a horizontal axis at 29 and 30. Bracket 28 may also serve to carry the compass card 31 through suitable supporting standards 32. The gyro rotor 23' is mounted in casing 23 for rotation about a horizontal axis at right angles to axis 29, 30 in the manner well known in the art. As shown, the pivotal axis 29—30 is above the center of gravity of the gyroscope so that the gyroscope is pendulously supported.

For indicating the inclination of the gyroscope about axis 29—30, and hence the deviation of the compass from the meridian, I may provide a pair of levels 33, 34 suitably attached to gyro casing 23. By way of example I have shown the levels adjustably mounted by means of screw supports 35 and nuts 36 in brackets 37 secured to said casing. Springs 38 may be interposed between the rods of said levels and said brackets, if desired. Levels 33 and 34 are preferably of differing sensitiveness so that a more accurate indication can be secured.

Figure 5:
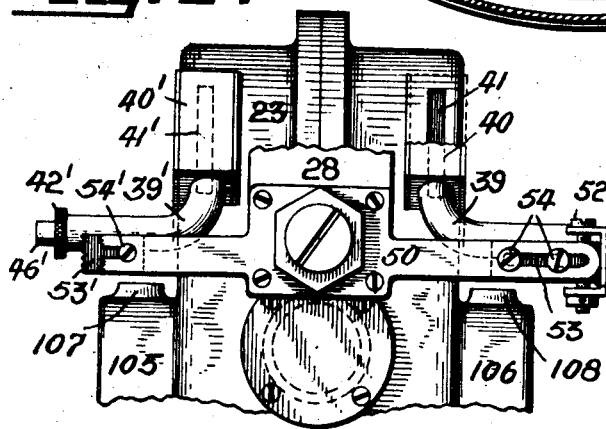
Fig. 5 is an end elevation of parts shown in Fig. 1 and comprising my improved damping means.

A compass of this type, when mounted on an aircraft, may be subject to violent oscillations. For instance, should the compass be locked to the aircraft, by means to be described later in detail, and released when the craft is inclined at a substantial angle, the compass may oscillate for a considerable time about the horizontal axis 29—30 before being brought to rest. To damp such oscillations in the minimum time I have provided a quick acting and powerful damping means constructed substantially as follows:

Communicating with the interior of the gyro casing 23 is a pair of pipes 39, 39' (see Fig. 5). I have shown the pipes as communicating at their bases with suitable chambers 40, 40', which chambers in turn communicate through slots 41, 41' with the interior of casing 23. As shown, chambers 40, 40' are disposed substantially tangentially with respect to casing 23 and thus serve to store air driven by the centrifugal force resulting from rotation of the gyro rotor, said air being forced into said chambers and out through pipes 39 and 39'. Of course, if desired, pipes 39 and 39' could communicate directly with the interior of casing 23.

Figures 6, 7:
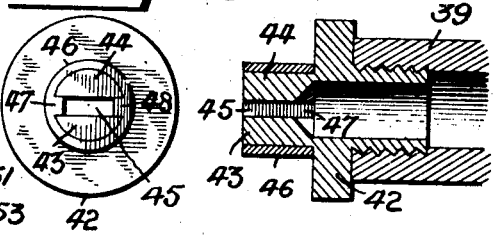
Fig. 6 is a front elevation of a nozzle used in connection with the damping means.
Fig. 7 is a vertical section through said nozzle.

Said pipes may be provided with nozzle pieces similar in construction. One form of such nozzle is shown in Figs. 6 and 7 in connection with pipe 39. Nozzle piece 42 is shown threaded at one end into pipe 39 and comprises at its forward end a pair of extensions 43, 44 with a passageway 45 therebetween, said passageway being of considerably less cross-sectional area than the passage through the pipe and the threaded portion of the nozzle. Surrounding extensions 43, 44 is a sleeve member 46 which may have projections 47 and 48 entering between extensions 43 and 44 and serving to limit the width of passageway 45 to the desired amount.

For quickly damping oscillations of the gyroscope about horizontal axis 29—30 I have provided vanes 49, 49' adapted to cooperate respectively with pipes 39, 39' when the gyro casing is tilted in one direction or the other about said axis. Said vanes are shown supported from bracket 28 through the medium of a cross piece 50. Preferably the vanes are adjustably mounted in said cross piece so that not only may the distance of a vane from the corresponding nozzle be varied, but also the distance between the upper edge of the vane and the lower edge of the nozzle passageway, so that the action of the damping means may be controlled with a high degree of accuracy. To this end I have provided the means illustrated in detail in Figs. 4, 5, and 8.

Figure 8:
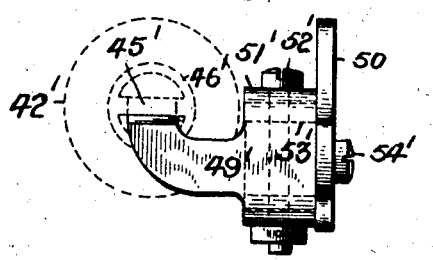
Fig. 8 is an end view of a detail.

As shown, vane 49 extends from a bracket 51, which bracket may be adjusted in a vertical plane, with reference to cross arm 50, by means of a screw 52 which connects said bracket with a block 53 mounted on said cross arm. Said block 53 is in turn adjustable longitudinally on cross arm 50, through the medium of a slot in said cross arm and screws 54 on the block. The mounting of vane 49' is similar to that of vane 49 and is shown in Fig. 8, wherein parts similar to those associated with vane 49 are designated by the same numerals with a prime added.

From the construction described, it will be readily apparent that normally the jets of air from pipes 39 and 39' produce equal but opposite reactions. When, however, the gyroscope tilts in one direction about horizontal axis 29—30 vane 49 will come opposite the nozzle of pipe 39, and a reaction pressure about the vertical axis of the gyroscope is produced which causes the gyroscope to turn about horizontal axis 29—30 back to its normal position. Likewise, when the gyroscope turns in the opposite direction, vane 49' comes opposite the nozzle of pipe 39' which results in an opposite reaction pressure about the vertical axis and consequent precession of the gyroscope about horizontal axis 29—30 to normal position. As is evident from the structure disclosed, each vane can be accurately adjusted with respect to its corresponding nozzle so that the vane will come into the path of the air jet upon the least turning movement of the gyro casing 23 about axis 29—30 and so that the effect of the air jet can be varied, with the result that oscillation of the gyroscope about said axis may be quickly and effectively damped. The damping means which I have described is of great strength as compared with the mass of the gyroscope so that the torque produced about the vertical axis is of sufficient magnitude to cause rapid downward precession of the gyroscope about horizontal axis 29—30. The settling of the compass on the meridian is thus materially hastened.

As it may be desirable at times to centralize and lock the gyroscope with respect to the aircraft I have provided an effective and practical centralizing and locking means of simple construction which may be constructed substantially as follows:

Attached in any suitable manner to the bottom of the casing 23 is a frusto-conical member 55 shown in detail in Fig. 3 and having a groove 56 in its periphery. Member 55, in effect, thus forms part of the casing. Adapted to cooperate with member 55 is a frusto-conical sleeve-like member 57 to which may be secured a plurality of tubular sleeves 58. Each sleeve may contain a plunger 59 slidably mounted therein to engage one of its ends with groove 56. The plunger may be biased to such position by means of a spring 59' attached at one end to a lug 60 on sleeve 58 and at the other to a projection 61 on the plunger, said projection extending through a slot 62 in the sleeve. The outer ends of the plungers pass through vertical slots 63 in lower supporting sleeve 64 of casing 1. Surrounding supporting sleeve 64 is a rotatable sleeve 65 provided with guideways 66 for operating the plungers 59. By way of illustration I have shown three guideways 66 (see Fig. 10), one for each plunger, though it is obvious that the number of plungers and guideways may be varied as desired. The guideways are shown as each comprising outwardly projecting portions of sleeve 65 provided with a slot 67 therebetween, which slot receives the plunger 59. Slot 67 is shown inclined from the bottom of sleeve 65 toward the top thereof and has a substantially straight portion 67' extending for a short distance adjacent said top. Each plunger is provided at its outer end with a head 68 exterior to sleeve 65 and forced by spring 59' into engagement with the edges of guideways 66. The edges of guideways 66 surrounding slots 67' are curved as shown at 69 in Fig. 9 to provide cam surfaces for withdrawing plungers 59 from engagement with groove 56 upon initial rotation of sleeve 65 in the correct direction from its position shown in Fig. 1. Sleeve 65 may be provided with knobs 65' to aid in turning it when desired.

Assuming the gyroscope to be centralized and locked to the aircraft, as shown in Fig. 1, should it be desired to unlock said compass, sleeve 65 should be turned in a clockwise direction, looking down in Figs. 4 and 9. Cam portions 69 of guideways 66 will then cooperate with heads 68 of plungers 59 to withdraw said plungers from engagement with groove 56. After said plungers have been thus withdrawn, further rotation of sleeve 65 will bring the inclined portions of slots 67 into engagement with the plungers whereby said plungers may be lowered to the bottom of said inclined slots and will carry with them sleeve 57. Hence, by rotation of sleeve 65 in one direction the locking plungers are retracted and the locking sleeve lowered to release the gyroscope. Rotation of sleeve 65 in the reverse direction will obviously first operate to raise sleeve 57 into engagement with member 55, thus centralizing the gyroscope, then to release plungers 59 so that springs 59' may bring them into engagement with groove 56 of member 55 to lock the gyroscope to the aircraft. It will readily be seen that, while sleeve 57 and pins 59 serve to lock the gyro about horizontal axis 29—30, they do not prevent rotation of the gyro about a vertical axis. Consequently the gyro may, while locked, be turned about the vertical axis to restore it to the meridian in case it has departed therefrom.

In the construction which I have described it will be seen that rotation of the compass card 31 with relation to the aircraft can take place only to a limited extent before some part of member 16 adjacent bearing portion 16' contacts with arm 13. Consequently, in order to permit complete rotation of the compass card, arm 13 must be turned as through shaft 9 to prevent contact of said arm with member 16. For readily turning shaft 9 I have shown a knob 70 mounted on said shaft and provided with a suitably roughened edge 71. Thus, by turning knob 70, arm 13 can be kept out of contact with member 16 and complete rotation of the compass card permitted. Preferably some means should be provided for indicating when arm 13 is in such position relative to the compass card that maximum angular movement of the card can occur before said arm must be moved. For example, a suitably colored pointer 72 may be mounted on ring 11 and may cooperate with a suitably colored indication or indications on card 31 to indicate such position. Thus the operator can at a glance determine the angular relation between arm 13 and card 31 so that arm 13 can be moved before said relation becomes too great.

Another means for indicating said angular relationship may take the form shown in detail in Fig. 4, wherein arms 73, 74 which aid in supporting the compass card from member 16 and which are shown at right angles to bracket 28, may have painted thereon arrows of different colors corresponding with differently colored portions of the arms of bracket 10. For example, arm 73 may be provided with a white arrow 73' which, when the relative position of arm 13 and the compass card is such that maximum angular movement of the card can take place, lies opposite a white mark on one arm of bracket 10. Likewise, arm 74 may have red arrow 74' adapted to register with a red mark on the other arm of said bracket. The operator, by noting the position of either arrow with relation to its corresponding mark on bracket 10 can thus readily perceive when turning of arm 13 is necessary.

The lubber line which cooperates with the indications on card 31 to indicate the direction of travel of the aircraft is shown at 75 and may comprise a reference member supported at its upper end from casing 1. I have shown said member 75 as having its upper end mounted in a bushing 76 which may be secured by means of a screw 77 to a sleeve or collar 78 surrounding shaft 9 and rotatable relatively thereto. Said collar may be supported by a washer 79 (see Fig. 11) secured by screw 80 to shaft 9.

To obtain accurate readings of the compass, a correction depending upon the latitude and the speed of the craft, as well as upon the heading, must be applied. A full discussion of the necessity for and the principles underlying such corrections will be found in the patent to E. A. Sperry, Serial No. 1,255,480, of February 5, 1918. I prefer to apply such corrections to the lubber line, for which purpose I may use means shown in detail in Figs. 11 and 12 and constructed substantially as follows:

Extending upwardly from sleeve 78 is a projection 83 which extends upwardly through an arcuate slot 84 in bushing 8 and is received within a fork 85 at one end of a lever member 86 pivoted at 87 to a bracket 88 suitably secured at one end to bushing 8 by screws 89 and at the other to casing 1 by screws 90. Pivoted at 91 to bracket 88 is a lever member 92 which lies beneath lever 86 and is provided with a fork 93 within which is received a cam or eccentric 94 rotatable with shaft 9. Cam 94 is so designed that, when shaft 9 is turned to follow up the movement of the compass card, a movement corresponding to the amount of turning of shaft 9, which in turn depends upon the change in heading of the craft, will be imparted to lever 92. For transmitting this motion of lever 92 to the lubber line to correct the compass reading for the change in heading and for further applying a correction depending on the speed and latitude of the craft, I have shown lever 92 also provided with a groove within which is mounted a slidable member 95. Preferably member 95 is grooved on opposite sides as shown in Fig. 13 into which grooves extend projecting edges 96 on lever 92. Member 95 also extends within a slot 97 in one end of lever 86 and thus constitutes a connection for transmitting motion from lever 92 to lever 86. The latter lever is provided with an intermediate slotted portion 98 through which shaft 9 passes and by which at the same time pivotal movement of the lever with relation to the shaft is permitted. A bracket member 99, the upper surface of which is provided with curves 100 corresponding to different speeds, may be suitably secured to lever 92. Adapted to cooperate with said curves is an arm 101, attached to or integral with member 95, and provided with graduations 102 corresponding to different latitudes. It will thus be seen that, if member 101 be moved to cause the graduation 102 corresponding to the latitude to intersect with the graduation 100 corresponding to the speed of the craft, member 95 will be positioned in accordance with said speed and latitude. The movement imparted by lever 92 to lever 86 and hence to projection 83 and lubber line 75 will vary accordingly. Thus, for zero latitude and zero speed, member 95 would lie directly above pivot 91 of member 92 so that no motion would be transmitted to lever 86, while for other latitudes and speeds member 95 would assume different positions in slot 97 and the motion transmitted to the lubber line would be accordingly varied.

It will now be seen that, if shaft 9 be turned to follow up accurately the movements of the compass card, as by the aid of pointer 72 and a suitable cooperating mark on card 31, cam or eccentric 94 will cause a certain amount of motion to be imparted to lever 92 and hence to lever 86 and the lubber line. Obviously if member 95 be now positioned in accordance with the latitude and velocity of the craft, and if eccentric 94 and associated parts be properly designed, the proper correction depending upon the speed, latitude, and direction of heading of the craft will be applied.

In case the gyro becomes tilted about horizontal axis 29—30 it may be restored to its normal vertical position by manually applying a torque in the proper direction about the vertical axis. For this purpose knobs 103, 104 may be provided on opposite arms of bracket 28 as shown in Fig. 1. To aid in applying the torque in the proper direction, each arm of said bracket may be provided with oppositely pointing and differently colored arrows as shown in Fig. 14, one colored red, for instance, and the other blue. Each arrow may indicate the direction in which the bubbles of the levels will move when torque is applied in the direction of the arrow. If desired, one of each level may be provided with an N colored to correspond with one arrow and the other end with an S corresponding in color with the other arrow, to indicate which end of the level will rise or fall when torque is applied in accordance with the corresponding arrow. As is understood by those skilled in the art, the restoring of the gyro casing 23 to vertical position will aid the gyro to more quickly settle on the meridian. By watching the bubbles of the levels, the operator can determine when the gyro is departing further from the meridian and can immediately restore the casing 23 to a truly vertical position, and the settling of the compass on the meridian will be materially hastened.

To aid in resetting the gyro on the meridian as determined by some other suitable means in case the gyro departs therefrom, I have provided the means shown in Fig. 15. As shown in this figure, extensions 105 and 106 of gyro case 23 may each be provided with a knob 107, 108. Each knob may have thereon an arrow indicating the direction in which the gyro will precess about a vertical axis, for a given direction of rotation of the gyro rotor, if a downward force is applied to the knob. Also each knob may be provided with the letter N or S as the case may be, indicating whether the aforesaid precession will be towards the north or south. Thus, in Fig. 15, downward pressure on knob 107 will cause precession toward the north, while downward pressure on knob 108 will cause precession toward the south.

The operation of my gyro compass will be readily understood from the foregoing. After the gyro has been unlocked by turning sleeve 65 in the proper direction, the compass will seek the meridian and will point to the true north. Oscillations about the horizontal axis 29—30 will be readily damped by the reaction of the air jets impinging on one or the other of vanes 49, 49'. In case the gyro becomes inclined about axis 29—30 and it is desired to restore it quickly by hand to its normal, vertical position, torque may be applied to one or the other of knobs 103, 104 in the proper direction as indicated by the adjacent arrows. By turning shaft 9 to bring pointer 72 in registration with a given point on the compass card 31, said shaft will be caused to follow-up the movement of the card, and, at the same time the proper correction for speed, latitude, and course will be applied, through cam 94 and levers 92 and 86 to the lubber line, if member 95 has been positioned in accordance with said latitude or speed. By noting the angular distance between either of arrows 73' or 74' and the correspondingly colored portion of bracket 10, or between pointer 72 and the mark above referred to, the operator may turn shaft 9 at or before the time necessary to avoid contact between member 16 and arm 13. If, at any time, the compass should depart from the meridian and it should be desired to reset the compass on the meridian as indicated by some other known means, as by another compass, such resetting may occur by applying pressure to the proper one of knobs 107, 108. Another way by which the gyroscope may quickly be restored to the meridian is to lock the gyro by turning sleeve 65 in the proper direction and then, by grasping handles 103 and 104, to turn the gyroscope about the vertical axis into the meridian.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In gyroscopic apparatus, the combination with a gyro rotor and a casing in which said rotor is journaled, of a frame pivoted about a vertical axis and in which said casing is supported for oscillation about a horizontal axis, a nozzle communicating with the interior of said casing and adapted to discharge a fluid for exerting a torque on the gyroscope about a vertical axis, and a vane attached to said frame and adjacent said jet for cooperation therewith.

2. In gyroscopic apparatus, the combination with a gyroscope of a jet thereon adapted to discharge a fluid for exerting a torque on the gyroscope, a member positioned adjacent the jet for varying the torque exerted thereby, and means for adjusting said member in either of a plurality of planes with respect to said jet.

3. In gyroscopic apparatus, the combination with a gyro rotor and a journal casing therefor, of a frame in which said casing is journaled for movement about a horizontal axis, a jet communicating with said casing, a vane adjacent said jet, an arm connected with said frame, and a member carried by said arm and adjustable in one plane, said vane being supported thereon for adjustment in another plane.

4. In a gyroscopic compass, in combination with an encased gyroscope having a normally horizontal spinning axis, means for mounting the same for turning about a vertical axis and for oscillation about a horizontal axis, means for preventing pivotal movement of said gyroscope about said horizontal axis, and means including a rotatable member for releasing said second-named means.

5. In a gyroscopic apparatus, the combination with a gyro rotor and a journal casing therefor, of a frame in which said casing is mounted for oscillation about a horizontal axis, a locking sleeve adapted to engage with said casing to centralize the casing about said axis, and means including a rotatable member for moving said sleeve to locking position.

6. In gyroscopic apparatus, the combination with a gyro rotor and a journal casing therefor, of a frame in which said casing is mounted for oscillation about a horizontal axis, a frustro-conical extension secured to said casing, a frustro-conical sleeve adapted to engage said extension to prevent movement of said casing about said axis, and displaceable means carried by said sleeve for securing said sleeve to said extension.

7. In gyroscopic apparatus, the combination with a gyro rotor and a journal casing therefor, of a frame in which said casing is mounted for oscillation about a horizontal axis, a sleeve engageable with said casing to prevent such oscillation, displaceable means for securing said sleeve to said casing, and rotatable means for displacing said displaceable means.

8. In gyroscopic apparatus, the combination with a gyro rotor and a journal casing therefor, of a frame in which said casing is mounted for oscillation about a horizontal axis, a sleeve engageable with said casing to prevent such oscillation, displaceable means carried by said sleeve and adapted to secure said sleeve to said casing, and rotatable means for first displacing said displaceable means and then withdrawing said sleeve from engagement with said casing.

9. In a gyroscopic compass comprising a gyroscope having three degrees of freedom, means for locking and unlocking the same about a horizontal axis, said means permitting the same to be adjusted about the vertical axis while locked.

10. The combination with a gyroscope pivotally mounted about a horizontal axis, of a movable member for locking the gyroscope against movement about said axis, a rotatable sleeve provided with inclined slots, projections carried by said member and extending into said slots, and means whereby said sleeve may be rotated to move said member either forward or away from the locking position.

11. In gyroscopic apparatus, the combination with a gyro rotor and a journal casing therefor, of a frame in which said casing is mounted for oscillation about a horizontal axis, a sleeve movable into engagement with said casing, a plunger carried by said sleeve and movable to engage with an annular groove in said casing, means for moving said plunger, and means for moving said sleeve into or out of locking engagement with said casing.

12. In gyroscopic apparatus, the combination with a gyro rotor and a journal casing therefor, of a frame in which said casing is mounted for oscillation about a horizontal axis, said casing having secured thereto an extension with an annular groove, a sleeve movable into engagement with said extension to prevent oscillation of the casing about said axis, a movable plunger carried by said sleeve and adapted to engage said groove, means for moving said plunger into or out of such engagement and for moving said sleeve into or out of engagement with said extension.

13. In combination with an encased gyroscope pivotally mounted about horizontal and vertical axes, means for locking the gyroscope against movement about the horizontal axis but permitting movement about the vertical axis.

14. In gyroscopic apparatus, the combination with a gyro rotor and a journal casing therefor, of a support, means mounting said casing for oscillation about a horizontal axis, and means on said support including a sleeve adapted to surround a part of said casing for centralizing and locking said casing against such oscillation.

15. In a gyroscopic compass for use on moving vehicles, a rotatable indicating member, a reference member cooperating therewith, a rotatable shaft, an eccentric mounted thereon, a lever cooperating with said eccentric, a second lever connected to said reference member, a connection between said levers, and means for shifting said connection in accordance with the speed and latitude of the vehicle.

16. In a gyroscopic compass, a rotatable compass card, a reference member cooperating therewith, a rotatable shaft, means whereby said shaft may be rotated to follow-up movements of the compass card, a lever forked at one end, a cam on said shaft and positioned within the forked end of said lever, a second lever connected to said reference member, and a connection between said levers.

17. In a gyroscopic apparatus for use on a moving vehicle, a compass card, a reference member, cooperating therewith, a shaft adapted to be manually rotated to follow up movements of said card, and means for transmitting motion from said shaft to said reference member, comprising means for varying the movement of said reference member in accordance with the speed and latitude of the vehicle.

18. In a gyroscopic compass, a gyro rotor, a casing in which said rotor is journaled, a frame in which said casing is mounted for oscillation about a horizontal axis, a bearing member on said frame, a support on which said frame is mounted through said bearing member for movement about a vertical axis, means for rotating said support, said bearing member and support carrying indicating means for showing when said member and support have assumed a certain position with relation to each other.

19. In a gyroscopic compass, a support, a gyroscope mounted thereon for movement about a vertical axis, a compass card movable with said gyroscope, manual means for rotating said support, and a reference member on said support cooperating with said card.

20. In a gyroscopic compass, indicating means for showing the position of the gyroscope in azimuth, a level for showing whether the gyroscope is off the meridian, means for locking the gyroscope and means for turning the same while locked to bring it quickly toward the meridian if displaced.

21. In gyroscopic apparatus, a gyroscope pivoted for movement about axes at right angles to each other, a level having means for indicating the amount of tilting of said gyroscope about one of said axes, and means for indicating the direction in which torque should be applied about the other axis for causing movement of said indicating means in a given direction.

22. In gyroscopic apparatus, a gyroscope pivoted for movement about axes at right angles to each other, there being indicating means on the gyroscope for showing the direction in which precession will occur about one axis when torque is applied in a certain direction about the other axis.

In testimony whereof I have affixed my signature.

ELMER A. SPERRY, Jr.